J. H. BERNATH AND E. C. REYNOLDS.
TRANSMISSION APPARATUS.
APPLICATION FILED JULY 21, 1919.

1,361,300.

Patented Dec. 7, 1920.
2 SHEETS—SHEET 1.

Witness
George W. Gooseyetts

Inventor
John H. Bernath
E. C. Reynolds
By H. B. Willson & Co.
Attorneys

J. H. BERNATH AND E. C. REYNOLDS.
TRANSMISSION APPARATUS.
APPLICATION FILED JULY 21, 1919.
1,361,300.
Patented Dec. 7, 1920.
2 SHEETS—SHEET 2.
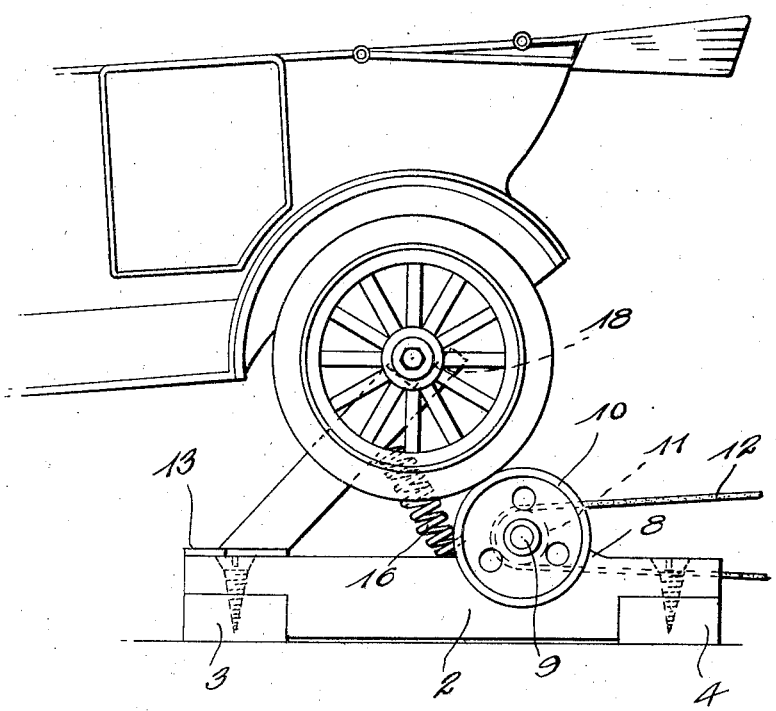
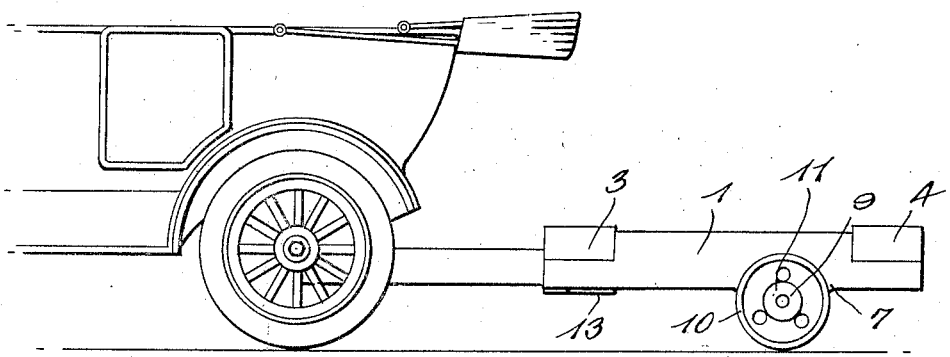
Inventor
John H Bernath
E. C. Reynolds
Witness
George W. Giovanetti
By H. R. Willson & Co.
Attorneys

UNITED STATES PATENT OFFICE.

JOHN H. BERNATH AND ERNEST C. REYNOLDS, OF WAUSEON, OHIO.

TRANSMISSION APPARATUS.

1,361,300.  Specification of Letters Patent.  Patented Dec. 7, 1920.

Application filed July 21, 1919. Serial No. 312,177.

*To all whom it may concern:*

Be it known that we, JOHN H. BERNATH and ERNEST C. REYNOLDS, citizens of the United States, residing at Wauseon, in the county of Fulton and State of Ohio, have invented certain new and useful Improvements in Transmission Apparatus; and we do declare the following to be a full, clear, and exact description of the invention, such as will enable others skilled in the art to which it appertains to make and use the same.

This invention relates to certain new and useful improvements in transmission apparatus.

The principal object of the invention is to provide an apparatus whereby the power of the driving wheels of a motor vehicle, while said vehicle is standing still, may be utilized for driving a transmission shaft mounted in bearings attached to a stationary base or frame.

Another object of the invention is to provide a device of this character having an improved means for supporting the vehicle with its driving wheels off of the ground and holding them tightly against the friction wheels carried by the transmission shaft of the device.

A still further object of the invention is to provide a power transmission device which is so constructed that it may be manually moved from one place to another or it may even be converted into a trailer and drawn by a motor vehicle.

An additional object of the invention is to generally improve upon devices of this class by the provision of an extremely simple, strong, durable and inexpensive construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters designate like parts throughout the several views:—

Fig. 3 is a side view of the device, showing the rear end of an automobile connected thereto in operative position; and, Fig. 4 illustrates the manner in which the apparatus is used as a trailer for the automobile when transporting it from one place to another.

Figure 1:
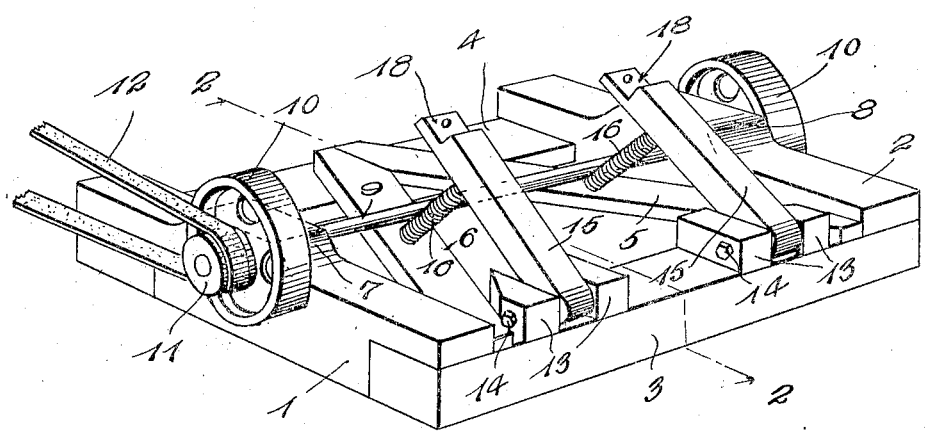
Figure 1 is a perspective view of an apparatus embodying the features of this invention.
Figure 2:
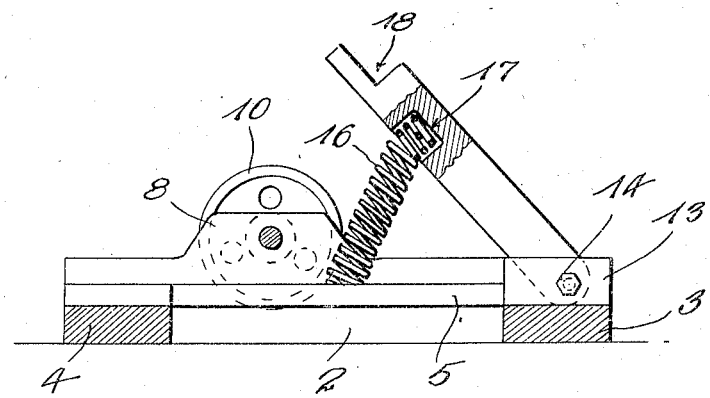
Fig. 2 is a sectional view of the device taken on the plane indicated by the line 2—2 of Fig. 1.

Referring more particularly to the drawings a substantially flat supporting frame or base is shown. This comprises a pair of side bars 1 and 2 and a pair of cross or end bars 3 and 4, the latter being connected in any suitable manner to the ends of the side bars 1 and 2. Connecting the end bars 3 and 4 and secured thereto at their ends is a pair of braces 5 and 6, the latter converging from the forward end bar 3 to the rear end bar 4. These braces serve to make the rectangular frame a rigid structure.

The side bars 1 and 2 are provided with suitable bearings 7 and 8, and revolubly journaled in these bearings is a power transmission shaft 9, to the ends of which are fixed friction wheels 10, the latter being spaced apart a distance equal to the distance between the driving wheels of an automobile or other motor vehicle. Fixed also to the shaft 9 adjacent one of the friction wheels 10 is a pulley 11 adapted to receive a driving belt 12 to transmit power from the shaft to machinery.

The forward end bar 3 is provided with two pairs of spaced lugs 13, and pivoted between these by suitable bolts or pins 14 are braces 15. When the device is resting on the ground ready to be used as a power transmission apparatus the braces 15 incline from their pivoted to their free ends and are yieldably supported in this inclined position by means of coiled springs 16, the latter having their upper ends fitted in sockets 17 arranged in the lower side of the braces 15 and their lower ends resting upon the braces 5 and 6. The free ends of the braces 15 are provided with suitable axle receiving seats, here shown in the form of notches 18.

In operation, assuming that the device is resting upon the ground in the position shown in Fig. 1 and anchored to the ground in any convenient manner, as an automobile or other motor vehicle is backed on inclines (not shown) toward the wheels 10, the axle thereof will first touch the bars 15 and depress these bars until the automobile takes the position shown in Fig. 3. As soon as the axle reaches the notches 18 in the bars 15 the latter will spring upwardly and prevent the automobile from moving forward. The weight of the rear end of the machine will thus hold the driving wheels of the same in tight contact with the friction wheels 10 so that when the engine of the machine is in operation and the wheels are driven, power will be transmitted to the shaft 9 and from there it may be taken by the belt 12.

In transporting the device from one place to another the braces 15 are swung into a longitudinal position with respect to the frame and the springs 16 are removed. The frame is then inverted so that it rests upon the friction wheels 10. In this position the braces 15 may either be used as handles in pushing the device or as draw bars, shown in Fig. 4, in pulling it.

From the foregoing description taken in connection with the accompanying drawings, the construction, use and operation of the device will be readily understood without a more extended explanation.

As various changes in form, proportion, and in the minor details of construction may be resorted to without departing from the spirit of this invention, we do not wish to be limited to the construction herein shown and described other than as claimed.

We claim:

1. A power transmission device comprising a base, a horizontal shaft mounted on said base and having spaced friction wheels adapted to support the rear wheels of an automobile when the latter is backed onto said wheels, an axle holder mounted on said base for vertical movement, and a spring supporting said axle holder in position to be struck and depressed by the axle of a machine run onto the device, said spring being active to raise said axle holder to operative position when the axle has reached a predetermined point with the rear wheels of the automobile resting operatively on the friction wheels aforesaid.

2. A power transmission device comprising a base, a horizontal shaft mounted on said base and having spaced friction wheels adapted to support the rear wheels of an automobile when the latter is backed onto said wheels, a brace pivoted to said base at a point spaced laterally from said shaft, said brace inclining from its pivoted end to a point above said shaft and having an axle seat at its upper end, and a spring supporting said brace in inclined position while permitting depression thereof as the axle of the automobile is brought into contact therewith when backing the machine onto said friction wheels, said spring serving to again raise the brace to engage the axle seat with the automobile axle when said axle reaches a point opposite said seat.

3. A transmission device comprising a base, a shaft mounted on said base and having friction wheels adapted to support the rear driven wheels of an automobile when the device is in use, said friction wheels serving to portably support the base when the device is inverted, and double-function means for either holding the automobile in place on the device or for drawing said device when the latter is inverted.

4. A structure as specified in claim 3, said double-function means comprising an arm pivoted to said base to swing either into contact with the automobile axle when the device is in use or to swing into substantially the plane of said base to be used for drawing the device.

5. A device of the class described comprising a substantially flat frame having bearings, a rotary transmission shaft journaled in said bearings, friction wheels and power take-off means fixed upon said shaft, a pair of braces pivoted at one of their ends to one end of said frame and having axle seats in their other ends, said braces inclining from their pivoted ends to receive the axle of a motor vehicle and support the same with its driving wheels in contact with said friction wheels and adapted to swing in a longitudinal direction with respect to said frame to be used as draft members or handles, and coiled springs removably disposed between said braces and said frame when said braces are in inclined positions.

In testimony whereof we have hereunto set our hands.

JOHN H. BERNATH.
ERNEST C. REYNOLDS.